W. H. PAULDING.
PORTABLE PUMP.

No. 190,512. Patented May 8, 1877.

WITNESSES:
Saml. F. Hay
E. D. Mackintosh

William Henry Paulding,
INVENTOR.

UNITED STATES PATENT OFFICE.

WILLIAM H. PAULDING, OF NEW YORK, N. Y.

IMPROVEMENT IN PORTABLE PUMPS.

Specification forming part of Letters Patent No. 190,512, dated May 8, 1877; application filed April 5, 1877.

*To all whom it may concern:*

Be it known that I, WILLIAM H. PAULDING, of New York, in the county of New York and State of New York, have invented certain new and useful Improvements in Portable Pumps, of which the following is a description, reference being had to the accompanying drawings, forming part of this specification, and in which—

Figure 1:
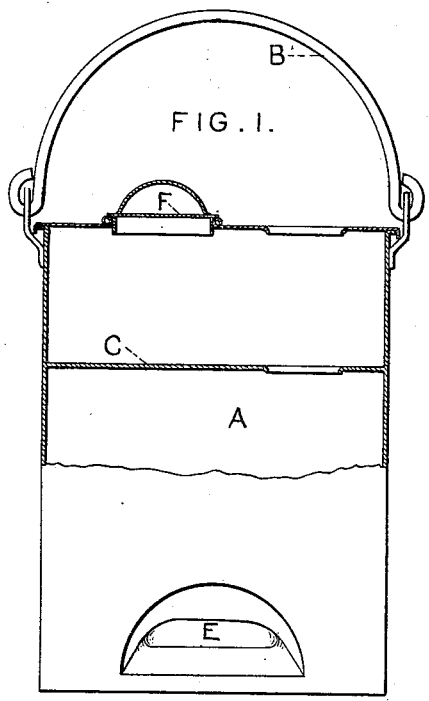
Figure 2:
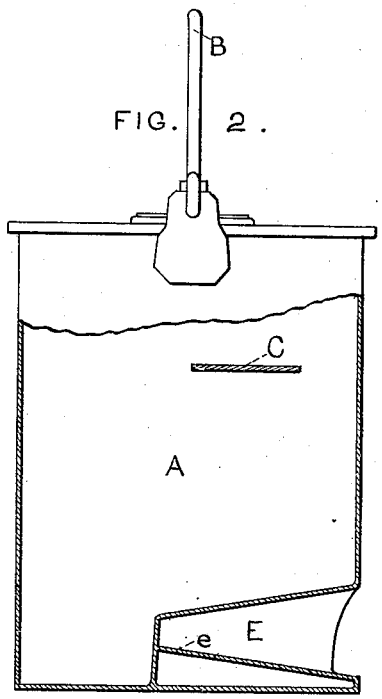
Figure 3:
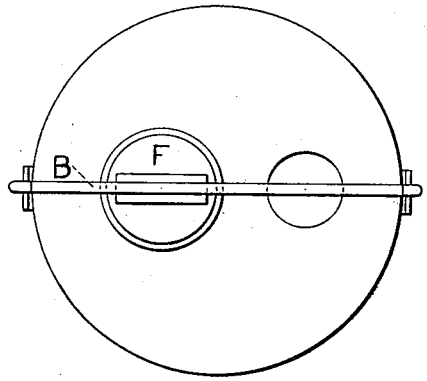
Figure 4:
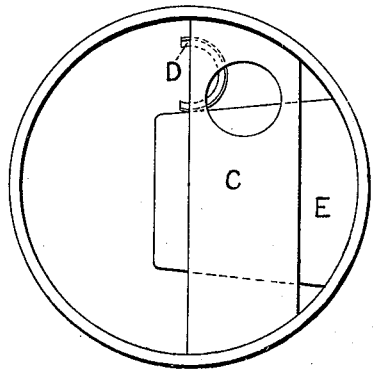

Figure 1 is a front sectional elevation. Fig. 2 is a side sectional elevation. Fig. 3 is a top plan. Fig. 4 is a top plan with cover removed.

The object of my invention is to construct a combined reservoir and pump in such a manner that the operator can hold the entire apparatus with but one foot.

This I accomplish in the following manner: A tank or reservoir, A, of any suitable form, but preferably cylindrical, is provided with a bail or handle, B, for convenience of transportation, and with a brace, C, and socket D, for securing in position any suitable pump.

It is found convenient in practice to have the socket D placed in such a position as will cause the pump, when attached, to assume a position inclined from the vertical. In view of this the socket is placed not only under, but to one side of, the brace C, as shown in Fig. 4.

The tank or reservoir is also provided—preferably near the base—with a recess or receptacle, E, within which the operator may place his foot, and by exerting pressure on the part e', which is inclined from the horizontal for the purpose of accommodating the natural position of the foot, may firmly hold the complete apparatus while operating the pump.

The tank or reservoir is also provided with a cover, which is, in its turn, provided with a second and smaller cover, F, for one of the two openings which it contains, and which are for the following purposes: the covered opening, to enable the tank to be easily filled or emptied; the uncovered opening, to enable the upper part of the pump to protrude.

It may be found preferable, in some cases, to construct the openings for filling the tank of some other form, or in some other position. For instance, it might be on the side of the tank, and have the form of a spout; or it might be funnel-shaped for convenience of filling; or it might, in some cases, be advantageous to hinge a portion of the cover, instead of using the hole, as described.

The purposes to which my invention may be applied are numerous. It may be used as a garden-engine or a fire-extinguisher, or it may be used for washing carriages or windows, and many similar purposes.

In some of its many applications it might be found advantageous to provide the tank with legs, in which case, for the receptacle E could be substituted a stirrup, suspended from the tank; or a suitable support could be formed upon the said legs.

The advantages claimed for my invention are as follows: The pump and tank, when secured together, may be moved from place to place as easily as a water-pail or similar article, and the pump, being always partly immersed in the fluid, needs no suction-pipe. Being always in position, the pump and tank occasion no loss of time in arranging them for use, as does the kind commonly in use.

The weight of the tank and fluid gives stability to the whole apparatus, and helps the person using the pump to direct the stream with more precision and with less exertion of strength than is possible with the old style of pump.

I am aware that force-pumps provided with stirrups have been used; but I am not aware that tanks have been provided with similar appliances.

It will be observed that the recess or receptacle E being formed within the body of the tank A, and the pump being slightly inclined toward the operator, the parts are in the best relation to give stability to the whole apparatus, and by this construction the operator requires the use of but one foot to hold the tank firmly while operating the pump.

Therefore, I claim—

A tank or reservoir provided with a recess or receptacle, E, substantially as described, and for the purpose set forth.

WILLIAM HENRY PAULDING.

Witnesses:
SAML. F. HAY,
E. D. MACKINTOSH.